R. HUFF.
TRANSMISSION GEARING FOR MOTOR VEHICLES.
APPLICATION FILED DEC. 31, 1910.
1,033,176.
Patented July 23, 1912.
2 SHEETS—SHEET 1.
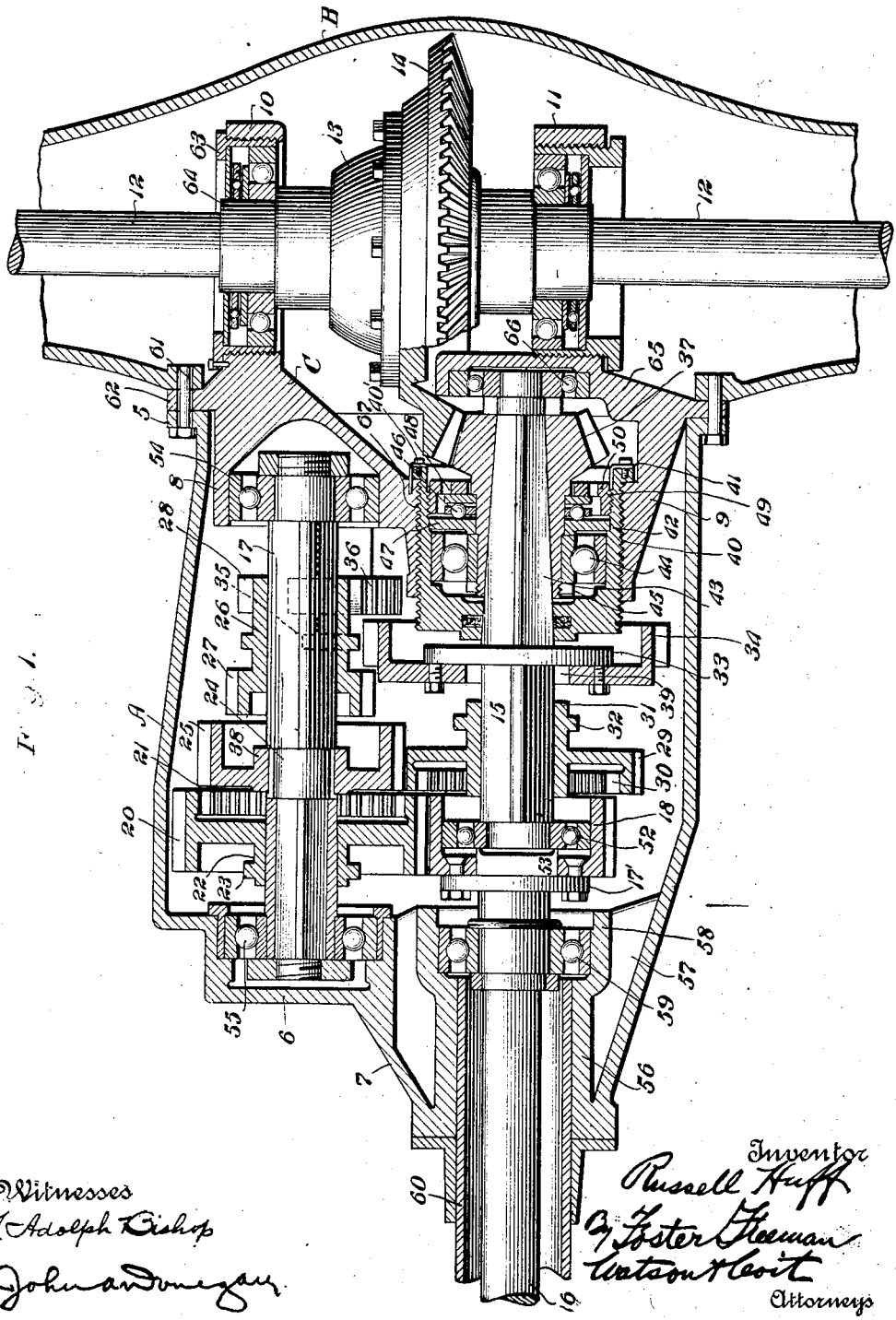

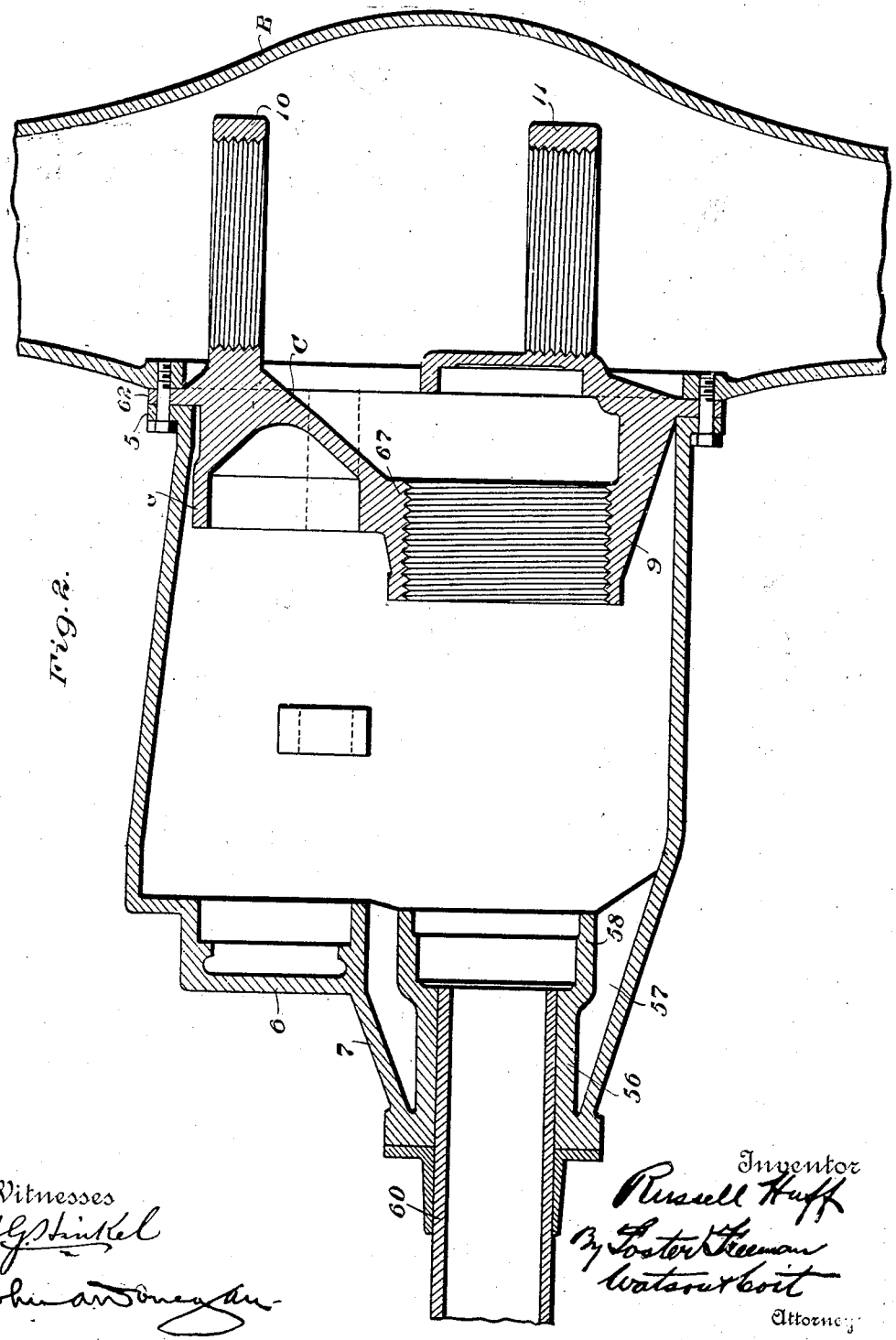

UNITED STATES PATENT OFFICE.

RUSSELL HUFF, OF DETROIT, MICHIGAN, ASSIGNOR, BY MESNE ASSIGNMENTS, TO PACKARD MOTOR CAR COMPANY, OF DETROIT, MICHIGAN, A CORPORATION OF MICHIGAN.

TRANSMISSION-GEARING FOR MOTOR-VEHICLES.

1,033,176.      Specification of Letters Patent.      Patented July 23, 1912.

Original application filed May 6, 1909, Serial No. 494,456. Divided and this application filed December 31, 1910. Serial No. 600,349.

*To all whom it may concern:*

Be it known that I, RUSSELL HUFF, a citizen of the United States, and resident of Detroit, Wayne county, and State of Michigan, have invented certain new and useful Improvements in Transmission-Gearing for Motor-Vehicles, of which the following is a specification.

This invention relates to improvements in transmission gearing for motor vehicles, and this application is a division of a co-pending application, Serial No. 494,456, filed May 6, 1909.

The primary object of the invention is the provision of a three speed transmission gearing of the selective type, certain of the gears of which are always in mesh and so arranged that during the operation of changing speed the gears will engage without noise and the danger of breakage reduced to a minimum.

Another object is the provision of a construction wherein the change speed mechanism will be supported by the rear axle housing, the distance between the end gears of said mechanism corresponding approximately to the width of four gear faces, whereby the flexibility and weight of the parts will be reduced to a minimum.

A still further object is the provision of a relatively short casing for the change speed mechanism, this casing being open at one end and provided with a closure which forms a bearing for the change speed mechanism. With this construction, two advantages are gained, first, the weight of the casing is reduced; and second, access to the speed changing mechanism is simplified.

Other advantages will appear and be more fully understood in the following description, taken in connection with the accompanying drawings, in which—

Figure 1 is a longitudinal sectional view through the change speed and differential mechanism; and Fig. 2 is a horizontal sectional view of the casing.

A designates the change speed casing and B the differential gear casing. The change speed casing is open at one end and at this end is provided with a lateral flange 5. The opposite end of the casing is provided with a pair of forward or outward extensions designated by the numerals 6 and 7, the latter extending beyond the former. A tail piece C nicely fits into the open end of the casing A and on its inner face is provided with bearing lugs 8 and 9 in alinement with the extensions 6 and 7. The opposite face of the tail piece is provided with bearing lugs 10 and 11 which form supports for the rear axles 12 arranged in the casing B. The differential housing 13 receives the inner ends of the axles 12 and is provided with a bevel gear 14.

Arranged in the casing A is a driven shaft 15 in axial alinement with the main driving shaft 16. One end of the main driving shaft connects with the motor (not shown). The counter-shaft 17 is located in the casing A, its opposite ends being supported by the bearing lug 8 and extension 6 in a manner to be presently described. The shaft 16 is provided at its inner end with a flange 17' to which is bolted a relatively wide gear 18 which meshes with a gear 20 of equal width sliding on the counter shaft 17. The gear 20 is an overhung gear having internal teeth 21 and a sleeve 22, the said sleeve having a collar 23.

A portion of the countershaft 17, upon which the gear 20 is mounted, is non-cylindrical in cross section so that the gear 20 will turn therewith. A portion of the countershaft 17 to the rear of the gear 20 is rounded as shown at 24, and rotatably mounted on the portion 24 is an overhung gear 25 of less diameter than the gear 20 and so positioned that when the gear 20 is moved rearwardly the internal teeth of the latter will mesh with the teeth on the gear wheel 25. Sliding on the countershaft 17 to the rear of the gear wheel 25 is a sleeve 26 provided at its opposite ends with gear wheels 27 and 28 of different diameters. The larger gear wheel 27 lies adjacent to the overhung gear 25 and is of a size to telescope the latter.

The driven shaft 15 is non-cylindrical in contour and sliding on this shaft and turning therewith is an overhung gear 29 located to the rear of the gear 18. The face of the overhung gear 29 is less than the width of the face of the gear 18. The overhung gear 29 meshes with the gear 25, and the said overhung gear is provided with internal teeth 30 to engage the gear 18 when the gear 29 is moved in one direction in the manner to be presently described. The overhung gear 29 is provided on one side with a sleeve 31 having adjacent to its outer end a collar 32. The driven shaft 15 is provided with a flange 33 to which is bolted an overhung gear 34. A sliding sleeve 35 provided with a gear 36 is mounted upon a second countershaft and this sleeve with its gear is connected with the sleeve 26 so as to slide therewith. The gear 36 constantly meshes with the gear 28 at the rear end of the sleeve 26, and is adapted to slide forwardly and mesh with gear 34 for reversing. The rear end of the driven shaft 15 is provided with a bevel pinion 37 which meshes with the bevel gear 14 on the differential housing 13.

As shown in Fig. 1, the gears 18 and 20 are in mesh; so also are the gears 29 and 25, and the gear 34 is positioned between the gears 27 and 28. The gears so arranged will be in neutral position, by virtue of the loose gear 25. Low speed is obtained by shifting 27 into engagement with 34, it being understood that the latter is the largest gear in the casing. When this shift has been made the train will then be 18, 20, 25, 29, 27, and 34. Inasmuch as the gear 25 is loose on the countershaft 17, motion will be imparted to the driven shaft 15 only by the gear 27. The second speed is obtained by shifting 20 into engagement with 25. When this is being done, the gear 29 will move simultaneously with the gear 20 in order to permit the internal teeth of the gear 20 to engage the gear 25. The train will then be 18, 20, 25 and 29. It will be observed that a single shifter may operate both gears 20 and 29, bearings for the shifter being provided by the sleeves 22 and 31, and also by the collars 23 and 32. It will be further observed when the parts are moved from the position shown in Fig. 1, to second speed, that the gears 18 and 20 will never move completely out of mesh, neither will the gears 25 and 29, whereby the shift will be made noiselessly and the danger of the teeth breaking, which sometimes results when the gears are slammed into engagement from one speed to another, will be practically prevented. The third speed or direct drive is obtained by shifting 29 into engagement with 18 during which movement, gear 20 will move simultaneously with gear 29, but in a direction opposite to that described when second speed is to be obtained. The train will then be 18 and 20. Reverse is obtained by sliding the sleeves 26 and 35 so that gear 36 engages with gear 34.

It will be noted that gear 27 is slightly overhung to receive the hub 38 of gear 25, thus permitting a maximum movement for the sleeve 26 with a minimum distance between the gears 27 and 28, and for a similar purpose, the end of the gear 34 which faces the sleeve 31 is provided with an enlarged opening 39 to receive the end of the sleeve 31 when the parts have been shifted for second speed. With this construction, it will be noted that the distance between the attaching webs of the gears 18 and 34 is equal approximately to the width of four gear faces, whereby the total length of the gear casing is reduced to a minimum.

40 is an exteriorly threaded sleeve screwed into the bearing lug 9 of the end piece, C, this sleeve being held in locked position by a locking device 40'. This sleeve is provided on its internal surface with a shoulder 42. The pinion 37 is provided with a shank 43 which surrounds the shaft 15 and extends into the sleeve 42. The shank is provided with a number of shoulders as shown. The sleeve receives the annular roller bearing 44, the outer ring of which tightly fits in the sleeve and the inner ring is secured to the shank 43 by means of the threaded nut 45. The roller thrust bearing 46 is received between the annular rings 47 and 48 and surrounds the shank 43. Ring 47 bears against the shoulder 42 and is restrained thereby. The ring 48 is secured in place by means of an inwardly projecting flange 49 on the threaded sleeve 50. The sleeve 50 is held in adjusted position by means of the locking device 41. The construction of the sleeve 43 and its bearings are such that the thrust of the pinion 37 on the shaft 15 is received in both directions through the roller bearings 46.

The gear 18 has on its interior surface the roller bearing 52 for one end of the shaft 15, and this roller bearing bears against a lug 53 on the flange 17'. The shaft 17 is supported in roller bearing 54 in the lug 8 of the tail piece C, the opposite end of the shaft being supported by roller bearing 55 in the extension 6. The extension 7 of the casing A is provided with an inwardly projecting sleeve 56, webs 57 connecting this sleeve with the extension 7. The sleeve 56 is provided with an enlarged portion 58 to receive the roller bearing 59 which supports one end of the shaft 16. The casing 60 extends into the sleeve 56. This casing surrounds the shaft 16 and is flexibly connected at one end to the frame of the vehicle (not shown) and acts as a torsion rod for the rear axle casing and a housing for the shaft 16.

Referring now to Fig. 1, it will be seen that the casings A and B, are connected by bolts 61 which pass through the flange 5 of the casing A and also through a flange 62 on the end piece C. The bearing lugs 10 and 11 of the end piece C receive the bearing sleeves 63 for the hubs 64 of the differential housing. The outer end of the bearing lug 9 is provided with a lug 65 for supporting the roller bearing 66 for the driven shaft.

The term roller bearing as used in the specification and claims is used in its broadest sense, that is as a generic term including both ball and cylinder anti-friction bearings.

With this construction, it will be manifest when the end piece C is removed, all mechanism can be removed at the end of the casing A. It will be seen that the sleeve 40 is of greater diameter than the pinion 37 so that when the locking device 67 is loosened, the sleeve and its attached parts may be removed as a unit, or if desired, the end piece C with all the parts attached thereto may be removed by removing the bolts 61.

Having thus described the invention, what is claimed is:

1. In transmission gearing, in combination, a shaft, intermediate and opposite end gears arranged on said shaft, said intermediate gear being fixed against axial movement and adapted to telescope within one of said end gears, and the other end gear being adapted to telescope within said intermediate gear.

2. In transmission gearing, in combination, parallel shafts, a gear fixed on one of said shafts, a gear rotatably mounted on the other of said shafts, and internally toothed overhung gears splined on both of said shafts to receive the fixed and rotatable gears.

3. In transmission gearing, in combination, parallel shafts, a gear fixed on one of said shafts, a gear rotatably mounted on the other of said shafts, internally toothed overhung gears splined on both of said shafts to simultaneously receive the fixed and rotatable gears.

4. In transmission gearing, in combination, drive, driven, and counter-shafts, a drive gear fixed on the drive shaft, a gear slidingly mounted on the counter-shaft and meshing with the drive gear, a gear slidingly mounted on the driven shaft, and a gear rotatably mounted on the counter-shaft and meshing with the gear on the driven shaft, the said sliding gears being movable into loose engagement with each other without disengaging from said fixed and rotatably mounted gears.

5. In transmission gearing, in combination, drive, driven, and counter-shafts, a drive gear fixed on the drive shaft, a gear slidingly mounted on the counter-shaft and meshing with the drive gear, a gear slidingly mounted on the driven shaft, and a gear rotatably mounted on the counter-shaft and meshing with the gear on the driven shaft, the sliding gear on the counter-shaft being adapted to positively engage the said rotatably mounted gear and loosely engage the sliding gear on the driven shaft without disengaging from the fixed gear on the drive shaft.

6. The combination with the two alined shafts and the countershaft parallel therewith, of a gear on each of said alined shafts and two gears on said countershaft respectively in mesh with the gears on the alined shafts, means for clutching together and unclutching the gears on the alined shafts, and means for clutching together and unclutching the gears on the countershaft.

7. The combination with the two alined shafts and a countershaft parallel therewith, of a gear on each of said alined shafts and two gears on said countershaft respectively in mesh with the gears on the alined shafts, means for clutching together and unclutching the gears on the alined shafts, and means for clutching together and unclutching the gears on the countershaft without moving any of the gears out of mesh.

8. The combination with alined shafts and a countershaft, of a gear on each of said alined shafts adapted to be brought into clutching relation one with the other whereby one shaft may be directly driven by the other, a gear rotatably mounted on said countershaft and in mesh with one of the gears on the alined shafts, and a sliding gear mounted to turn with said countershaft and adapted to be in constant mesh with the other gear on said alined shafts and to be moved into clutching engagement with the rotatably mounted gear on the countershaft.

9. The combination with alined shafts and a countershaft, of a pair of gears on the alined shafts one of which is slidable and adapted when moved in one direction to be brought into clutching engagement with the other of said gears, and a pair of gears on the countershaft respectively in mesh with the gears on the alined shafts, one of said latter pair of gears being movable in the other direction to effect a clutching engagement with its companion gear.

10. In transmission gearing, the combination with two alined shafts, a parallel countershaft and a parallel reverse shaft, of gears and clutches on said shafts arranged to transmit rotary motion from one alined shaft to the other at three different forward and one reverse speeds and including four longitudinally sliding gears two of which are adapted to be moved from their neutral positions in either direction to obtain two of said speeds and the other two of which gears are adapted to be simultaneously moved from their neutral positions in either direction to obtain the other two speeds.

11. The combination with a driving shaft, a driven shaft, alined therewith, and a parallel countershaft, of a gear fast on the driving shaft, a sliding spur gear on the driven shaft having teeth adapted to engage coöperating teeth on said driving gear, and gears on said countershaft in constant mesh respectively with the driving gear and spur gear.

12. In transmission gearing, the combination with change speed and differential mechanism; of a casing open at one end and inclosing said change speed mechanism, an end piece forming a closure for the open end of the casing and detachably secured thereto, said end piece having on one face thereof inwardly extending bearings for the change speed mechanism and further having on the opposite face outwardly extending bearings for the differential mechanism.

13. In gearing, alined shafts, a fixed gear on each of said shafts, and sliding means coöperating with said gears for obtaining various speeds, the distance between the remote sides of said gears being approximately equal to the aggregate width of four of the gear faces.

14. In gearing, alined shafts, a fixed gear on each of said shafts, and sliding means coöperating with said gears for obtaining two speeds and a direct drive, the distance between the remote sides of said gears being approximately equal to the aggregate width of four of the gear faces.

15. In gearing, alined shafts, and a countershaft, gears fixed on said alined shafts, and telescoping gears sliding on the countershaft for obtaining various speeds, the distance between the remote sides of the fixed gears on the alined shafts being approximately equal to the aggregate width of four of the gear faces.

In testimony whereof I affix my signature in presence of two witnesses.

RUSSELL HUFF.

Witnesses:
 W. H. FINCKEL, Jr.,
 RICHARD E. MARSTON.